No. 747,744. PATENTED DEC. 22, 1903.
W. E. MAULDIN.
HARROW ATTACHMENT FOR CULTIVATORS.
APPLICATION FILED AUG. 10, 1903.
NO MODEL.

Witnesses

Inventor
William E. Mauldin
By H. B. Wilson
Attorney

No. 747,744. Patented December 22, 1903.

UNITED STATES PATENT OFFICE.

WILLIAM E. MAULDIN, OF GROSVENOR, TEXAS.

HARROW ATTACHMENT FOR CULTIVATORS.

SPECIFICATION forming part of Letters Patent No. 747,744, dated December 22, 1903.

Application filed August 10, 1903. Serial No. 168,992. (No model.)

*To all whom it may concern:*

Be it known that I, WILLIAM E. MAULDIN, a citizen of the United States, residing at Grosvenor, in the county of Brown and State of Texas, have invented certain new and useful Improvements in Harrow Attachments for Cultivators; and I do declare the following to be a full, clear, and exact description of the invention, such as will enable others skilled in the art to which it appertains to make and use the same.

This invention relates to a harrow attachment for plow or disk cultivators.

The object of the invention is to provide a harrow attachment which may be conveniently substituted for the cultivator shovel or disk to render an ordinary cultivator available for harrowing purposes.

Figure 1:
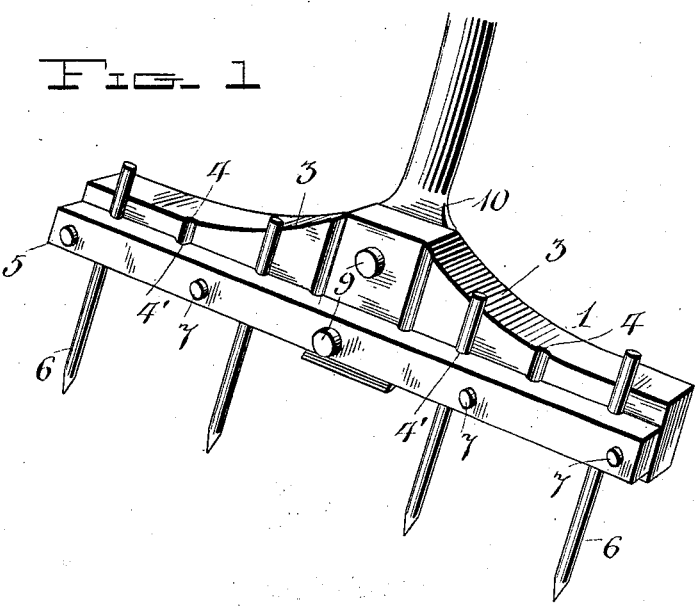
Figure 2:
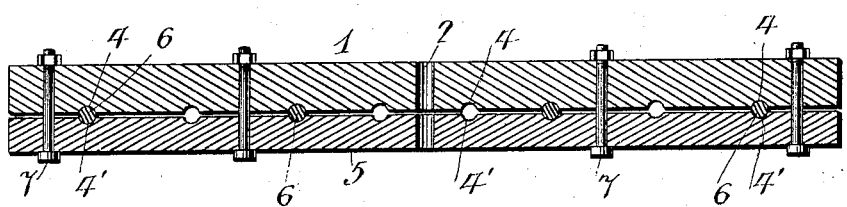
Figure 3:
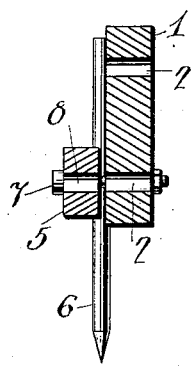

In the accompanying drawings, Figure 1 is a perspective view of a standard of a shovel-cultivator, showing the application of the harrow attachment thereto. Fig. 2 is a longitudinal section of the attachment, and Fig. 3 is a vertical section thereof.

My improved harrow attachment comprises a bracket-plate 1, provided at its center with a pair of bolt-holes 2, arranged one above the other. The upper edge of this plate on opposite sides of its center curves outwardly and downwardly toward its ends, as shown at 3, thus leaving the center of sufficient depth or height for the bolt-holes, with ends of diminished depth to secure lightness. The outer or front face of this plate is provided at suitable intervals with grooves 4.

Disposed in front of the bracket-plate 1 is a clamping-bar 5, which is provided upon its inner face with matching grooves 4'. These grooves 4 and 4' form seats to receive the harrow-teeth 6, which may be of any approved form to suit the purpose. Bolts 7 pass through the bar and plate and draw the same together, thus clamping the teeth 6 rigidly between them. A bolt-hole 8, formed in the bar, alines with the lower bolt-hole 2 in the plate 1.

In the use of the improved harrow attachment the shovel or disk is removed from its standard on the cultivator and the attachment applied by passing bolts 9 through the holes 2 and corresponding holes in the standard 10. One of these bolts also passes through the hole 8 in the bar 5, thus supplementing the action of the bolts 7 in holding the parts connected and clamping the harrow-teeth in their seats. One or more of the harrow attachments may be so applied and substituted for some or all of the disks or shovels that a combined plowing and harrowing or simple harrowing operation may be produced. The invention may be used in the cultivation of corn or cotton on the farm or in the garden for breaking the crust after a hard rain and pulverizing the soil to hold the moisture.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

A harrow appliance comprising a bracket-plate having a pair of central bolt-holes disposed one above the other and provided in its outer face with grooves, a clamping-bar having a bolt-hole registering with one of the aforesaid bolt-holes and formed in its inner face with matching grooves, harrow-teeth fitting in said grooves, bolts connecting the bar and plate and clamping the teeth between them, and bolts passed through the bolt-holes in the bracket to attach the same to a standard, one of said bolts also passing through the said bolt-hole in the clamping-bar, substantially as described.

In testimony whereof I have hereunto set my hand in presence of two subscribing witnesses.

WILLIAM E. MAULDIN.

Witnesses:
L. J. MAULDIN,
JOHN Y. RANKIN, Sr.